United States Patent [19]

Sturm

[11] Patent Number: 5,653,309

[45] Date of Patent: Aug. 5, 1997

[54] WILDLIFE OBSERVATION AND HUNTING PLATFORM

[76] Inventor: William Joseph Sturm, 1785 Emerald La., Fort Walton Beach, Fla. 32547

[21] Appl. No.: 526,720

[22] Filed: Sep. 8, 1995

[51] Int. Cl.$^6$ ........................................ E04G 3/00
[52] U.S. Cl. ........................ 182/187; 182/135; 182/136
[58] Field of Search .......................... 182/187, 188, 182/136, 135

[56] References Cited

U.S. PATENT DOCUMENTS

| | | | |
|---|---|---|---|
| 3,856,111 | 12/1974 | Baker | 182/187 |
| 4,124,094 | 11/1978 | Cande | 182/187 |
| 4,130,180 | 12/1978 | Ferguson et al. | 182/187 |
| 4,230,203 | 10/1980 | Sweat et al. | 182/134 |
| 4,316,526 | 2/1982 | Amacker | 182/135 |
| 4,331,216 | 5/1982 | Amacker | 182/187 |
| 4,427,092 | 1/1984 | Tentler | 248/218.4 |
| 4,458,782 | 7/1984 | Meyer | 182/187 |
| 4,834,217 | 5/1989 | Manes | 182/187 |
| 4,890,694 | 1/1990 | Williams | 182/187 |
| 4,987,972 | 1/1991 | Helms | 182/187 |
| 5,090,505 | 2/1992 | Amacker | 182/136 |
| 5,310,019 | 5/1994 | Paul | 182/187 |

*Primary Examiner*—Alvin C. Chin-Shue
*Assistant Examiner*—Anita M. King
*Attorney, Agent, or Firm*—Carnes, Cona and Dixon

[57] ABSTRACT

The wildlife observation and hunting platform, of the present invention, is a climbing tree stand for hunting and wildlife observation. The wildlife observation and hunting platform includes an upper frame and a lower frame. Secured to each frame is a platform. Each frame also includes an engaging bar that is adapted to aid in the securement of the hunting platform to the tree. A securing device is also provided to add to the security for attaching the tree stand to the tree. Each platform includes a foot insert to enable the user's feet to be fastened to the device. This will render the device to be propelled up the tree by the user's feet, using a stepping motion. Upon reaching the desired height the frame is leveled and locked by utilizing the engaging bars and the securing device.

17 Claims, 5 Drawing Sheets

WILDLIFE OBSERVATION AND HUNTING PLATFORM

BACKGROUND OF THE INVENTION

1. Field of the Invention

The present invention relates generally to a platform tree stand device for hunting and wildlife observation, and more particularly to a climbing platform tree stand device for hunting and wildlife observation that enables the feet of the user to be removably secured to the platform of the tree stand for providing the device to be propelled up the tree via the combination of the user's feet and platform, utilizing a stepping motion. Upon reaching the desired destination, the stand is locked in a fixed position on the tree.

2. Description of the Prior Art

For many years hunters, bird watchers, biologist, and others have sought ways to observe forested areas without detection. In response to this need various platforms for use in trees have been developed. Including the climbing tree stands that operate via the stand sit method. Various changes have been made in the platform configuration and in the locking and climbing mechanisms but room for improvement remains.

Accordingly, attempts have been made to refine climbing tree stands, for example, U.S. Pat. No. 4,834,217 issued to Manes discloses a tree stand device with an adjustable support frame/tree gripping mechanism, with a spring actuated locking mechanism. The device also includes a platform which is supported on the frame. This platform includes an upper section and a lower section, wherein the lower section supports the user's feet during the climbing operation, thereby providing for a stand-sit method for climbing the tree. This tree stand device, though efficient in providing an easier means of securing the device to a tree by eliminating the use of nuts, bolts, and the like in its operation, still suffers some shortcomings. Utilizing the stand-sit method to climb the tree provides a means of climbing that is tedious, slow, tiresome, and difficult to maneuver.

Another device is disclosed in U.S. Pat. No. 5,310,019 issued to Paul, which discloses a climbing tree stand with a foot climbing mechanism. This climbing mechanism is an improvement over the prior art, but it does not provide the user with the option of climbing the tree utilizing a stepping motion. The climbing mechanism in Paul, like other prior climbing tree stands, provides a tree stand that is cumbersome to use and manage while climbing the tree, as well as difficult to secure to the tree once a desired destination is obtained.

None of these previous efforts, however, provide the benefits intended with the present invention, such as providing a climbing tree stand that is easy to maneuver up a tree and that is adapted to be secured on the tree quickly and efficiently. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides for a climbing wildlife observation and hunting platform that includes an upper frame portion and a lower frame portion. Located on each frame is a folding platform that is adapted to aid the user while climbing up or down a tree. The frame is also designed and configured to be adjustable so as to accommodate a tree of any size or girth.

A locking mechanism is also provided that is adapted to be secured to the upper frame portion. This locking mechanism is adapted to wrap around the tree and provide added security. This locking mechanism is designed so as to be utilized with any conventional climbing platform tree stand device.

Accordingly, it is the object of the present invention to provide for a wildlife observation and hunting platform device that will overcome the deficiencies, drawbacks, and disadvantages of conventional hunting platform devices, or method of utilizing hunting platform devices.

It is another object of the present invention to provide for a wildlife observation and hunting platform device that is easy and safe to utilize, as well as providing an efficient and quick means for climbing and mounting the device to a tree truck.

It is yet another object of the present invention to provide for a wildlife observation and hunting platform device that can conform to any girth, size, or species of tree by providing the support frame to include an adjusting means.

It is still another object of the present invention to provide for a locking mechanism which can be utilized with any style or type of climbing hunting platform device.

A final object of the present invention is to provide for a wildlife observation and hunting platform device in accordance with the preceding objects and which will conform to conventional forms of manufacture, be of simple construction and easy to use so as to provide a device that would be economically feasible, long lasting and relatively trouble free in operation.

Although there have been inventions related to a the wildlife observation and hunting platform apparatus, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts apparatus of the present invention.

DESCRIPTION OF THE PREFERRED EMBODIMENTS

Figure 1:
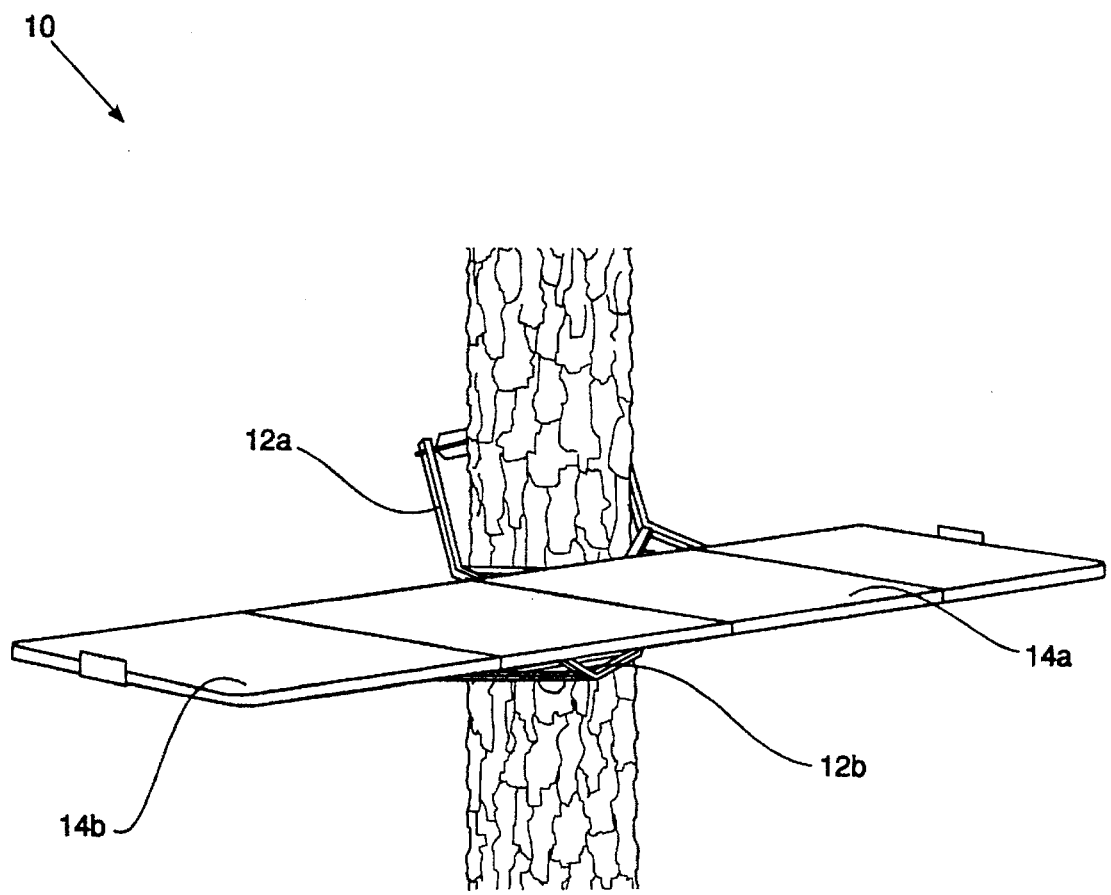
FIG. 1 is a perspective view of the present of the wildlife observation and hunting platform of the present invention attached to a tree.

As illustrated in the various views, FIGS. 1a–3a, the wildlife observation and hunting platform 10 of the present invention comprises an upper frame 12a and a lower frame 12b that are adapted to be secured to a tree trunk (illustrated, but not labeled), or the like. These frames 12a, 12b are also designed and configured to enable the user to climb up the tree by utilizing a stepping motion. Located on the upper frame 12a and the lower frame 12b are platforms 14a and 14b, respectively. These platforms are secured to each frame at approximately a 45 degree angle, so as to enable alignment of the platforms 14a and 14b, when the device is secured to the tree.

Figure 2A:
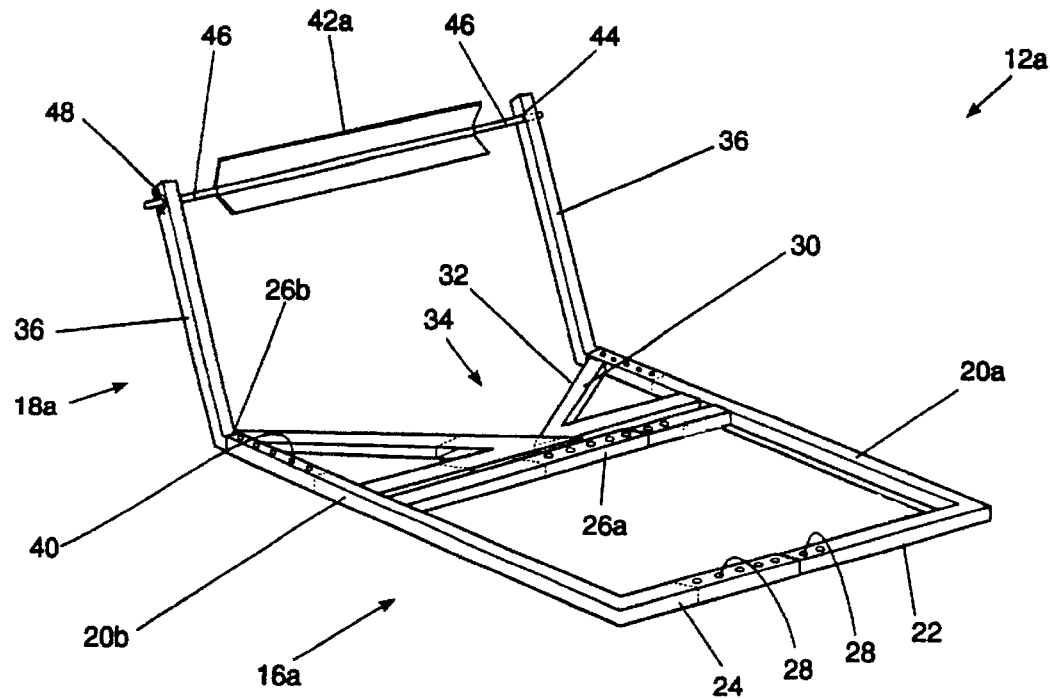
FIG. 2a is a perspective view of the upper frame used in the wildlife and observation hunting platform of the present invention.
Figure 2B:
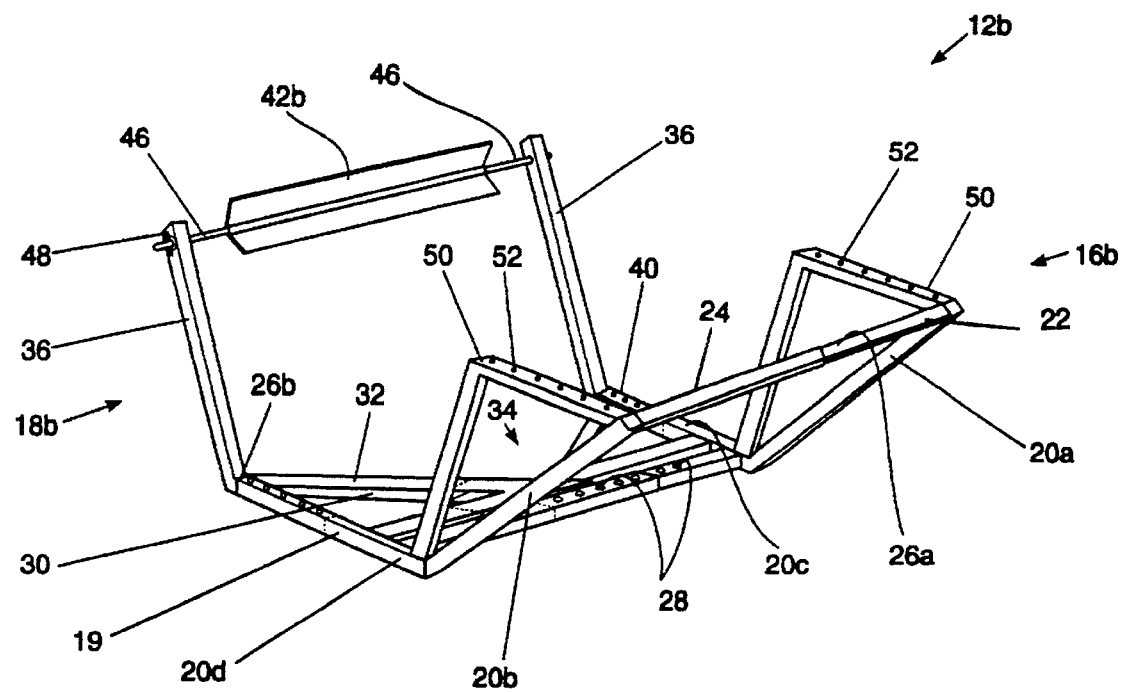
FIG. 2b is a perspective view of the lower support frame used with the wildlife observation and hunting platform of the present invention.
Figure 3A:
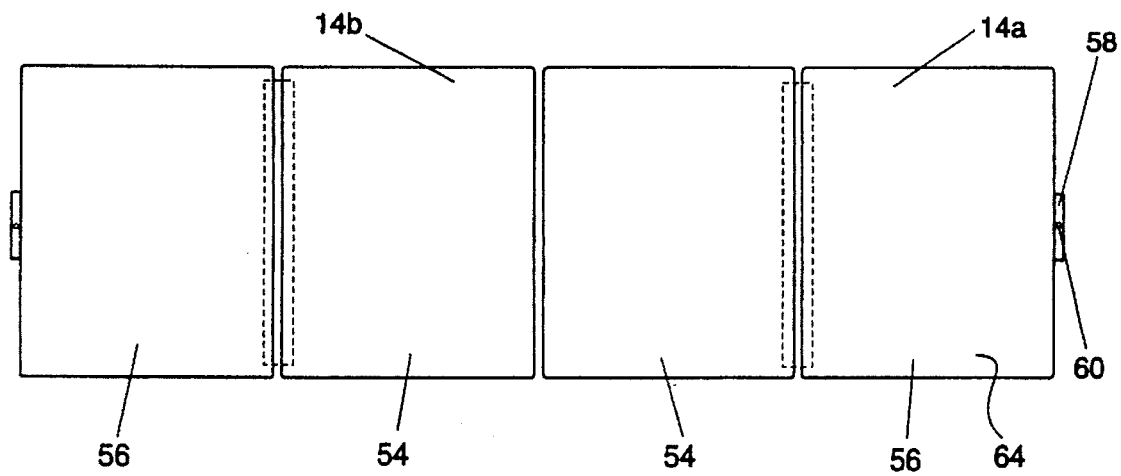
FIG. 3a a is a top planar view of the platforms, in an extended position, used in the wildlife observation and hunting platform device of the present invention.
Figure 3B:
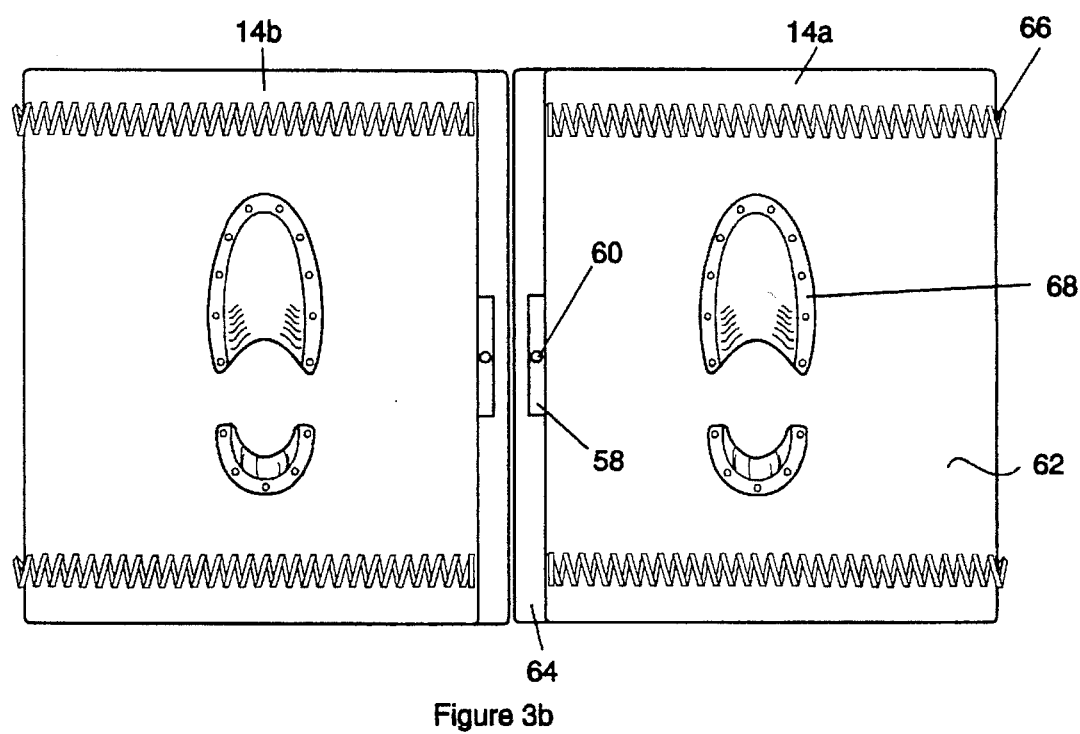
FIG. 3b is a top planar view of the platforms in a folded position, used in the wildlife observation and hunting platform device of the present invention.
Figure 3C:
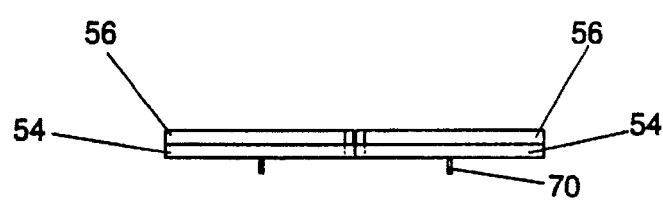
FIG. 3c is a side view of the platforms, in a folded position, used in the wildlife and observation hunting platform device of present.

The upper frame 12a and the lower frame 12b, illustrated in further detail in FIGS. 2a and 2b, each include a front support 16a and 16b, respectively, and a rear support 18a and 18b respectively.

This upper frame 12a is illustrated in further detail in FIG. 2a. As seen in this figure, the front support 16a of the upper frame 12a is generally rectangular in shape. This front support 16a includes side bars 20a and 20b, respectively, which are in a parallel relationship with each other. Extending outwardly from a lower end and a central location of the first side bar 20a is a first set of cross bars 22. Extending outwardly from a lower end and a central location of the second side bar 20b and towards the first set of cross bars 22 is a second set of cross bars 24. The first set of cross bars 22 are adapted to be receive by the second set of cross bars 24 to provide for the front support 16a to be adapted to be removably secured to the tree as well as providing for the front support 16a to wrap around the tree to accommodate the various species of trees. This design will render the front frame to include a first side that is adapted to be removably secured to a second side.

Once the second set of cross bars 24 are received in the first set of cross bars 22, securement of the second set of cross bars 24 is made to the first set of cross bars 22, via a securing means 26a. This securing means 26a can be any conventional securing means. As illustrated in these figures, the securing means is comprised of providing each set of cross bars with a plurality of holes 28. The holes enable a pin or the like to be inserted into the aligned holes in the first and second set of cross bars, thereby providing for the front support 16a to be in a fixed position. The design and configuration of the first set of cross bars and the second set of cross bars provide for a frame that can be adjusted to fit the girth of the tree.

The front support 12a further includes a set of wedges 30 that extend inwardly from the side bars 20a and 20b. The wedges 30 include angled members 32 that extend outwardly from the upper area of the first and second set of cross bars 22 and 24 to the upper ends of the side bars 20a and 20b, respectively. This will provide for the an opened area 34 to exists between the angled members 32.

The wedges are adapted to receive each other (illustrated in outline) or optionally can be adapted so that one wedge is located above the other wedge.

The upper frame 12a further includes a rear support 18b. The rear support 18a extends upwardly from the front support 16a to provide for the front support to be angularly secured to the rear support. This angular attachment occurs at an obtuse angle with respect to the front support. It is noted that angles of approximately 105–135 degrees have been used to produce excellent results.

The rear support 18a further includes a pair of outer side bars 36. Extending across the outer side bars 36 is an engaging bar 42a. This engaging bar is adapted to engage the trunk of the tree and maintain the upper frame 12a in a secured and locked position on the tree. Extending outwardly from distal ends of the engaging bar 42a are extensions 46. These extensions are adapted to be insertable into openings 44 which are located on each upper end of the side bars. The extensions 46 each include a through hole (not illustrated) in order to receive a pin 48. The contact of the engaging bar 42a with the tree and the use of the pin will provide a device that is adapted to be affixed to a tree.

The front support 16a and the rear support 18a are adapted to be adjusted to accommodate the various sizes and girths of trees. This adjustment provides for the lower end of the outer side bars 36 to include flanges (illustrated in outline, but not labeled) that are adapted to be received in the first and second sets of side bars, 20a and 20b respectively.

These flanges are secured to the lower end of the outer side bars 36 at an angular attachment point that occurs at an acute angle. It is this acute angular attachment that provides for the rear support 18a to be attached at an acute angle with respect to the front support 16a.

Once the flanges are received in the side bars, securement between the front support and rear support is made via a second securing means 26b. This second securing means 26b can be any conventional securing means. As illustrated in these figures, the securing means comprises providing each side bar and each flange to include a plurality of holes 40. The holes are adapted to receive a pin or the like, once alignment occurs between the flanges and crossbars, thereby providing for the front support to be secured to the rear support 18a.

Optionally, the holes of the first or second securing means 26a and 26b, respectively, can be threaded for receiving a threaded pin or the like.

The lower frame 12b is illustrated in further detail in FIG. 2b. As seen in this figure, the front support 16b of the lower frame 12b is generally rectangular in shape. This front support 16b includes side bars 20a and 20b, respectively, which are in a parallel relationship with each other.

Extending outwardly from the front support 16b, at an acute angle is a middle portion 19. Extending outwardly from the upper end of the front support 16b and the upper end of the middle portion 19 is a first set of cross bars 22 and a second set of cross bars 24. The first set of cross bars extend towards the second set of cross bars 24.

The first set of cross bars 22 are adapted to be received in the second set of cross bars 24 to provide for the front support 16b to be adapted to be removably secured to the tree as well as providing for the front support 16b to wrap around the tree in such a manner as to accommodate the any species of tree.

Once the first set of cross bars 22 are received in the second set of cross bars 24, securement of the second set of cross bars 24 are made to the first set of cross bars 22, via a securing means 26a as discussed and illustrated in FIG. 1b of the upper frame member. Accordingly, the securing means includes a plurality of holes 28 that are adapted to receive a pin once the holes are aligned.

A platform support 50 extends upwardly from the lower end of the side bars and extends outwardly from the upper end of the side bars 20a and 20b, respectively. This design and configuration will provide for the platform support 50 to be elevated. The elevation of the support 50 will enable the second platform to be aligned with the first platform of the upper frame 12a.

Located on the platform support 50 are a plurality of evenly spaced holes 52. These holes are adapted to receive studs or pins that are located on the platform for the lower frame. The platforms 14a and 14b are discussed in further detail in FIGS. 3a–3d.

The middle section of the lower frame 12b further includes a set of wedges 30 that extend inwardly from the side bars 20c and 20d of the middle section. The wedges 30 include angled members 32. The design and configuration of the middle portion provides for an opened area 34 to exists between the angled members 32. The middle section 19 is displaced from the front support 16b. This provides for the front support to be secured to the middle section at an acute angle with respect to the middle section. This displacement will provide for the lower platform of the lower frame to be aligned with the upper platform of the upper frame, once the device or seat is secured to the tree.

The lower frame 12b further includes a rear support 18b. The rear support 18b extends upwardly from the wedges to provide for the rear support to be angularly secured to the middle section. This angular attachment occurs at an obtuse angle with respect to the middle section. It is noted that angles of approximately 105–135 degrees have been used to produce excellent results. his angular attachment should be equivalent to the angular attachment of the upper frame member.

The rear support 18b of the lower frame further includes pair of outer side bars 36. Extending across the outer side bars 36 is an engaging bar 42b. This engaging bar 42b is adapted to engage the trunk of the tree and maintain the lower frame 12b in a secured and locked position on the tree. Extending outwardly from distal ends of the engaging bar 42b are extensions 46. These extensions are adapted to be insertable into openings 44 which are located on each upper end of the side bars 36. The extensions 46 each include a through hole (not illustrated) in order to receive a pin 48. The contact of the engaging bar 42b with the tree and the use of the pin will provide a device that is adapted to be affixed to a tree.

The front support 16b and the middle section 19 are adapted to be adjusted to accommodate the various sizes and girths of trees. This adjustment provides for the lower end of the outer side bars 36 to include flanges (illustrated in outline inside the side bars 20c and 20d of the middle section 19). The flanges are adapted to be received in the first and second side bars 20c and 20d, respectively, of the middle section 19. These flanges are secured to the lower end of the outer side bars 36 at an acute angular attachment point. This provides for the rear support to be secured to the middle section angularly.

Once the flanges are received in the side bars, securement between the middle section 19 and rear support 18b is made via a second securing means 26b. This securing means is similar to the securing means illustrated and discussed in detailed in FIG. 1a. Accordingly, the securing means illustrates a plurality of holes 40 to be located in the flanges and holes 40 to be located in the side walls 20c and 20d of the middle section.

Accordingly, when utilizing the frame, the user is able to disassemble the upper frame 12a and the lower frame 12b into sub-components. This disassembly occurs at a point of adjustment, hence the front supports 16a and 16b, respectively, for both the upper and lower frames 12a and 12b, respectively, are each adapted to be removably secured from the rear support 18a and 18b via the securing means 26b. The left side of the upper and lower frames are each adapted to be removable from the right side of the frame via the securing means 26a.

Further since the frame is designed and configured for the user to climb up the tree, then the angled members 30 are also adapted to be received each other. Or optionally, one angled member can be designed to be at a slight displacement with respect to the second angled member. This will enable the user to freely climb up or down the tree without the disruption or interference with respect to the wedges.

It is noted that the upper frame 12a and the lower frame 12b, are designed and configured so as to provide for the engaging bar to contact the back of the tree, while providing for the platforms to be parallel to the ground. This will provide for the platforms to be located perpendicularly with respect to the tree.

A first platform and a second platform are secured to the upper and lower frames, respectively. These platforms are illustrated in further detail in FIGS. 1 and 3a–3c. The first platform 14a is secured angularly (approximately 45 degrees) to the front support 16a of the upper frame 12a. The second platform 14b is angularly (approximately 45 degrees) secured to the platform support 50 of the lower frame 12b. This arrangement will provide for first and second platforms to be linearly and horizontally aligned once the device is secured to the tree. Additionally, when facing the front supports, the first platform and the second platform will appear to have a diamond shape.

The platforms each include a first member 54 that is hinged to a second member 56. This first member 54 is secured to the upper and lower frames. The second member 56 is adapted to be foldably secured to the first member 54. As seen, the first member is hingedly secured to the second member via hinge (illustrated in outlined, but not labeled). Accordingly, the second member 56 can be folded towards the first member 54 and locked in a secured position by way of a locking means 58. This locking means 58 can be any conventional locking means, such as providing a pin to extend into a hole 60 and through a hole (illustrated in outline in FIG. 3c, but not labeled) that is located in the first member.

Located on the under surface 62 of the first and second platforms of the second members are foot insert means 68.

These feet insert means are adapted to receive and maintain the user's feet so as to enable the user to climb the tree. Hence in a folded position, the upper surface 64 of the first member 56 will contact the upper surface 64 of the second member, inherently exposing the under surface 62 of the second member 56. Extending across the under surface 62 of the first and second members are torsion springs 66. These springs will provide adequate support for the user when the platform is in an extended state.

It is noted that the platforms can include just a first member 54. In this configuration the foot insert means 68 would be located on the upper surface 64.

Studs 70 extend downwardly from the under surface 62 of the first member 54. These studs 70 are adapted to be received in the openings of the upper frame and lower frame in order to lock the platform onto the device. A pin or nut is used with the stud for added security.

Figure 4A:
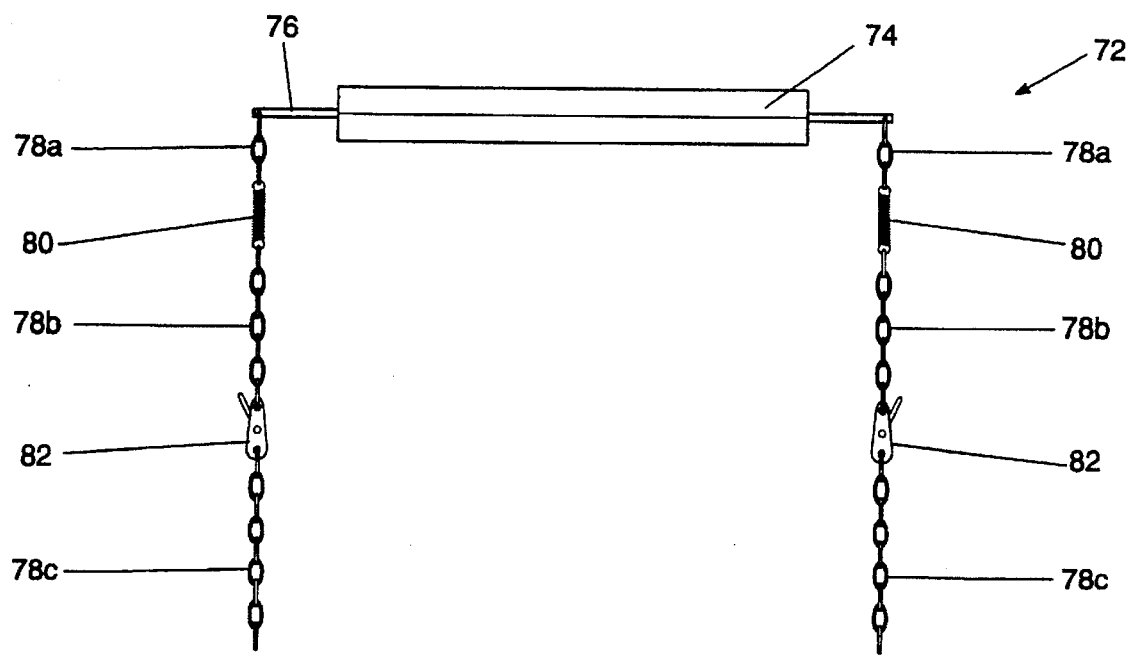
FIG. 4a is a front planar view of the locking device used in the wildlife and observation hunting platform device of the present invention.
Figure 4B:
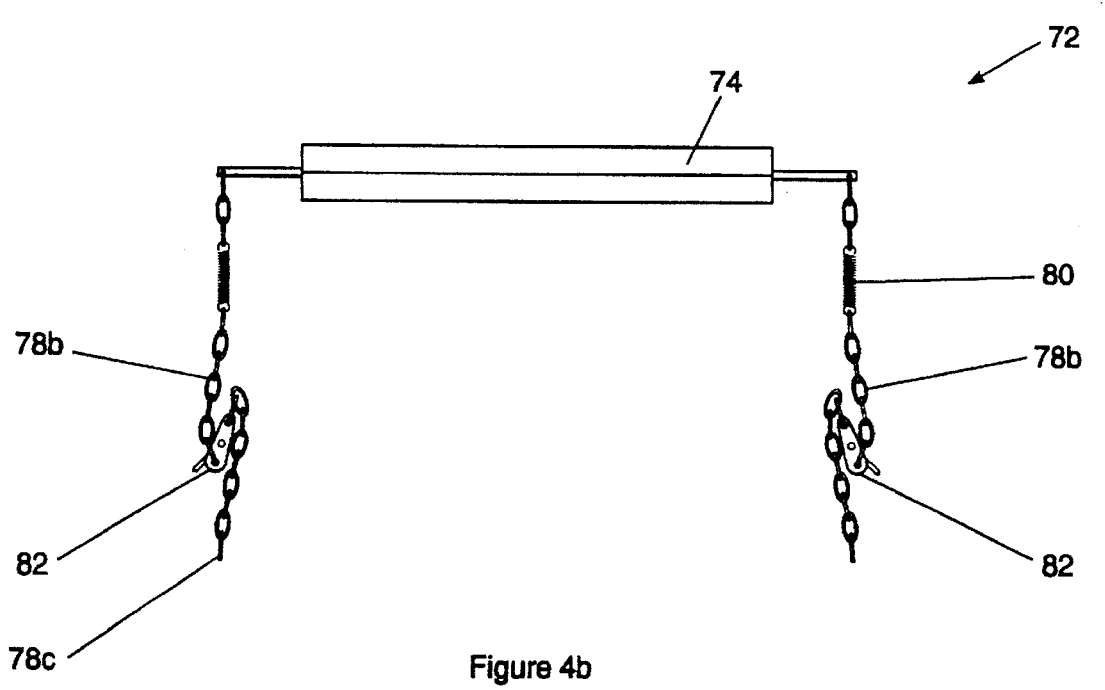
FIG. 4b is a front planar view of the locking device used in the wildlife and observation hunting platform device in a closed position.

Once the device is located at its desirable position, a locking device 72 may be used for added security. This locking device 72 is used to lock the upper and lower frames to the tree. This locking device is illustrated in further detail in FIGS. 4a and 4b. The locking device illustrated in these drawings are designed and configured to also be utilized with conventional climbing platforms.

As seen in these drawings the a locking device 72 includes a first chain member 78a, a second chain member 78b, and a third chain member 78c. Located between the first and second chain members is a spring 80. Located between the second and third chain members is a cam lock device 82.

Located between the two first chain members 78a is an engaging bar 74. Extending outwardly from the engaging bar 74 are extensions 76. Each extension is secured to the first set of chains 78a. The engaging bar 74 is similar to the engaging bar illustrated and discussed in further detail in FIGS. 2a and 2b.

The links of the third chain member 78c are adapted to receive the extensions 46 of the engaging bar (42a and 42b in FIGS. 2a and 2b). This will provide for the first engaging bar 42a to be located oppositely and parallel to the engaging bar 74 of the locking device 72. The pin 48 from the upper and lower frame will maintain the locking device 72 in a fixed position. Hence, in order to use this locking device, the third chain member 78c of the locking device 72 attaches to the extensions 46 of the upper frame. By utilizing the cam 82, the locking device is tightened around the tree, causing a secure and snug fit around the tree.

The design and configuration of the engaging bars 42a, 42b and 74 illustrated in FIGS. 2a, 2b, 4a, and 4b are designed to grip the trunk of the tree. As the climber climbs upward on the trunk, the diameter of the tree will inherently decrease in size. To accommodate for this decrease in size, the engaging bar can be rotated so that the distance between the engaging bar and truck is decreased. This will provide for a snug fit between the truck and the engaging bar.

Figure 5A:
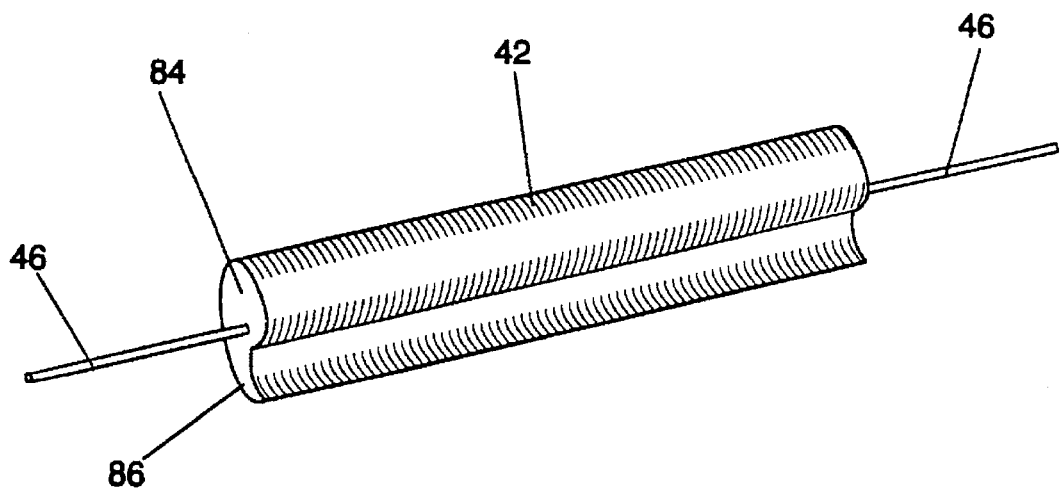
FIG. 5a is an alternative embodiment used for the engaging bar used in the wildlife and observation hunting platform device of the present invention.
Figure 5B:
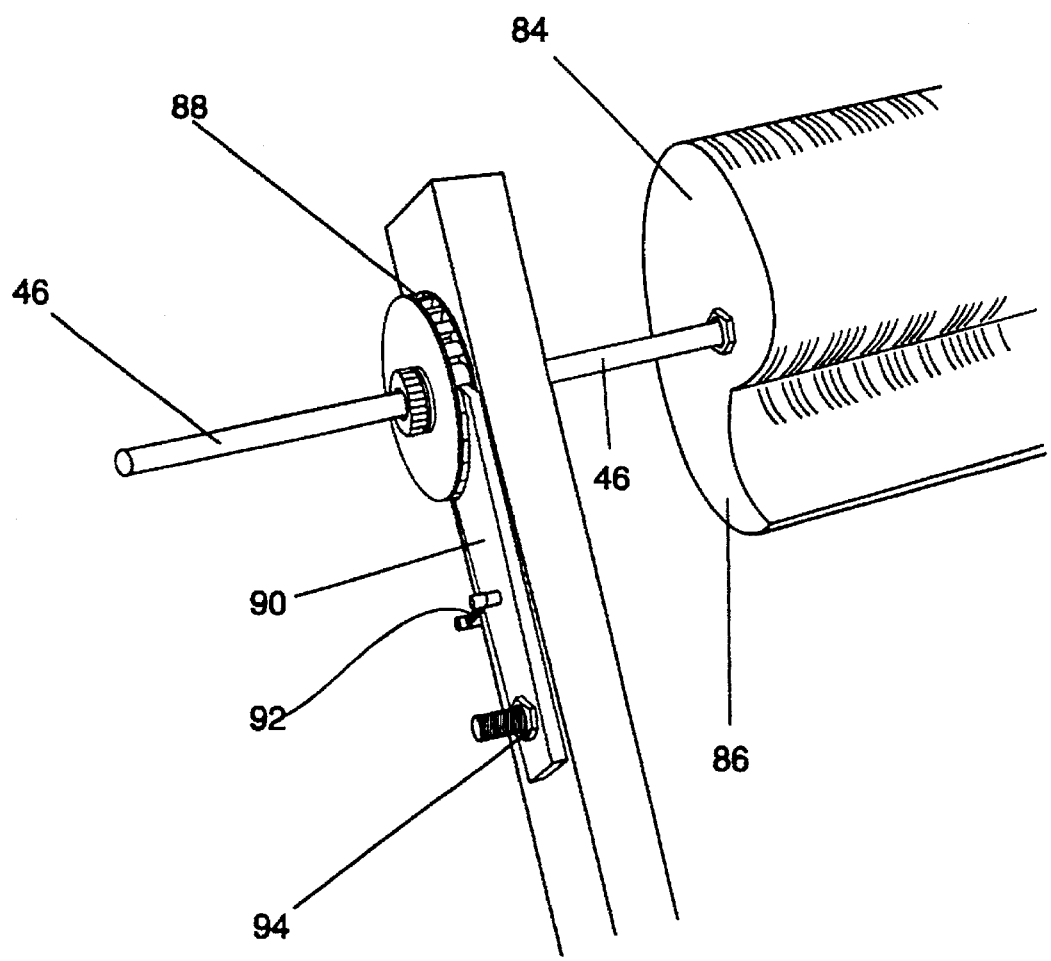
FIG. 5b is the alternative means for adjusting the engaging bar used in the wildlife and observation hunting platform device of the present invention.

The engaging bar, illustrated in the above described, embodiments can be altered to provide for a more efficient means for decreasing the area between the engaging bar and tree. This alteration is illustrated in further detail in FIGS. 5a and 5c. As seen in these figures, the engaging bar 42 includes a cam design which has an upper section 84 and a lower section 86. The upper section has a diameter that is substantially larger than the lower section 86. As illustrated in these figures, the distance between the tree and the engaging means would be minimal. Should a gap exists, the user would merely rotate the engaging bar 42. This rotation can occur by means of a gear system that is secured to both the side bar and extension 46. This gear system includes a gear box 88 having a plurality of teeth. Engaging the teeth of the gear box is a handle 90. This handle is adapted to engage or disengage the teeth of the gear box 88. A spring 92 is secured to the handle and to the side bar of the frame. Secured to the handle is an fastener means 94. This fastener means 94 is adapted to permanently or removably receive a wrench like device. Once received, the wrench like device can be rotated for disengaging the handle from the teeth so that the handle can engage the successor tooth. This will cause the extension 46 to rotate, inherently permitting the rotation of the engaging bar 42.

In order to use the wildlife observation and hunting platform device 10 of the present invention, the frame member is disassembled. The upper frame member 12a and the lower frame member 12b are then secured around the trunk of the tree to provide for the lower frame member to be located under the upper frame member. The engaging bars 42a and 42b are placed behind the tree, relative to the user, with the rear support frames 18a and 18b along either side of the tree. The front support frames 16a and 16b slide into the rear supports and are secured using the securing means 26b so that the frame is easily adjustable to the size of the tree. Once the adjustments to the frame are done, the platforms 14a and 14b are secured to the frame via the studs 70. To secure the platform, a pin or nut is used with the stud. The user's feet are fastened to the folded platforms by the foot receiving means 68. The device is then propelled up the tree by the user's feet, using a stepping motion.

Upon reaching the desired height, the frame is leveled and locked to the tree by the use of the engaging bars 42a and 42b. The locking device 72 can then be used to secure the stand to the tree.

Optionally, the wildlife observation and hunting platform may be equipped with a blind, made of camouflage material or the like.

While the invention has been particularly shown and described with reference to an embodiment thereof, it will be understood by those skilled in the art that various changes in form and detail may be made without departing from the spirit and scope of the invention.

I claim:

1. A wildlife observation and hunting platform comprising:
   an upper frame adapted to be removably secured to a tree;
   a lower frame adapted to be removably secured to said tree and said lower frame includes a platform support that extends upwardly from said lower frame;
   a first platform is secured to said upper frame and a second platform is secured to said platform support of said lower frame;
   said first platform and said second platform each include a foot receiving means for enabling a user to climb said tree in a stepping motion, once secured to said tree, said first platform is aligned with said second platform.

2. A wildlife observation and hunting platform as in claim 1, wherein said upper frame and said lower frame each includes a first adjusting means for adjusting a first side to a second side of said upper frame and said lower frame.

3. A wildlife observation and hunting platform as in claim 2, wherein said upper frame and said lower frame each includes a second adjusting means for adjusting a front section to a rear section of said upper frame and said lower frame.

4. A wildlife observation and hunting platform as in claim 1, wherein said upper frame includes a first engaging bar and said first engaging bar is adapted to engage said tree, and said lower frame includes a second engaging bar that is adapted to engage said tree.

5. A wildlife observation and hunting platform as in claim 4, wherein said first engaging bar and said second engaging bar can be adjusted for eliminating a distance between said tree and said wildlife observation and hunting platform.

6. A wildlife observation and hunting platform as in claim 3, wherein said upper frame includes a first engaging bar and said first engaging bar is adapted to engage said tree, and said lower frame includes a second engaging bar that is adapted to engage said tree.

7. A wildlife observation and hunting platform as in claim 6, wherein said first engaging bar and said second engaging bar can be adjusted via an adjusting means for eliminating a distance between said tree and said wildlife observation and hunting platform.

8. A wildlife observation and hunting platform as in claim 1 wherein said upper frame includes a front support and a rear support, said rear support of said upper frame extends upwardly from said front support at an obtuse angle, said first platform is secured to said front support of said upper frame, said lower frame includes a second front support, a middle portion and a second rear support, said second front support extends outward from said middle portion at an acute angle, and said second rear support extends outwardly from said middle portion at an obtuse angle, said middle portion is located between said second front support and said second rear support, and said platform support is located on said second front support.

9. A wildlife observation and hunting platform as in claim 8, wherein said first platform is angularly secured to said upper frame and said second platform is angularly secured to said lower frame so as to provide for said first frame to be aligned with said second frame when said hunting platform is secured to said tree.

10. A wildlife observation and hunting platform as in claim 1 wherein said first platform is removably secured to said upper frame via a securing means and said second platform is removably secured to said platform support of said lower frame via a second securing means.

11. A wildlife observation and hunting platform as in claim 8, wherein said front support of said lower frame further includes a first set of wedges, said first set of wedges include an angled member that extend outwardly from a center location of said front support for providing an opened area to exists between said angled members, said opened area receiving said tree, said middle portion includes a second set of wedges, said second set of wedges include an second angled member that extend outwardly from a center location of said middle portion for providing a second opened area to exists between said second angled member, and said second opened area to receive said tree.

12. A wildlife observation and hunting platform as in claim 1, wherein said first platform and said second platform each includes a first member that is hinged to a second member for providing said second member to be foldably secured to said first member, and said first member is secured to said hunting platform, and a foot inset means is located on the under surface of said second member.

13. A wildlife observation and hunting platform as in claim 12, wherein a torsion spring is secured to said under surface of said first member and said second member, and a locking means secures said first member to said second member when said first platform and said second platform are in a folded position.

14. A wildlife observation and hunting platform as in claim 1, wherein a locking device is adapted to be removably secured to said upper frame or said lower frame.

15. A wildlife observation and hunting platform as in claim 1, wherein said locking device comprises an engaging bar having opposite ends, extensions are secured to each end, a first chain member is secured to each extension, a spring is secured to each first chain member, a second chain member is secured to each spring, a cam device is secured to each second chain member, and a third chain member is secured to each cam device for providing said third chain member to be adapted to be removably secured to upper frame or said lower frame, and said cam devices are adapted to be locked so as to enable said locking device to tighten around said tree.

16. A wildlife observation and hunting platform as in claim 5, wherein said adjusting means includes a gear system having a gear box with a plurality of teeth, a handle is adapted to engage or disengaged said teeth, a spring is secured to said handle, a fastener means is secured to said handle and is adapted to receive a wrench device for permitting rotation of said engaging bar by enabling said handle to disengage from said teeth so that said handle can engage a successor tooth for inherently permitting rotation of said engaging bar.

17. A locking device to be used in combination with a wildlife observation and hunting platform secured to a tree comprising:

an engaging bar having opposite ends;

extensions are secured to each end;

a first chain member is secured to each extension;

a spring is secured to each first chain member;

a second chain member is secured to each spring;

a cam device is secured to each second chain member; and a third chain member is secured to each cam device for providing said third chain member to be adapted to be removably secured to said wildlife observation and hunting platform and said cam devices are adapted to be locked so as to enable said locking device to tighten around said tree.

* * * * *